US008947986B1

(12) United States Patent
Araki et al.

(10) Patent No.: US 8,947,986 B1
(45) Date of Patent: Feb. 3, 2015

(54) HEAT SINK FOR THERMALLY ASSISTED MAGNETIC RECORDING (TAMR)

(71) Applicant: Headway Technologies, Inc., Milpitas, CA (US)

(72) Inventors: Hironori Araki, Santa Clara, CA (US); Yoshitaka Sasaki, Los Gatos, CA (US); Hiroyuki Ito, Sunnyvale, CA (US); Shigeki Tanemura, Sunnyvale, CA (US); Seiichiro Tomita, Milpitas, CA (US); Yukinori Ikegawa, Cupertino, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 14/475,861

(22) Filed: Sep. 3, 2014

(51) Int. Cl.
*G11B 11/00* (2006.01)

(52) U.S. Cl.
USPC ............... 369/13.33; 369/13.13; 369/112.27

(58) Field of Classification Search
CPC ............ G11B 5/4866; G11B 2005/0021; G11B 5/314; G11B 5/6088; G11B 2005/001; G11B 7/1387; G11B 11/10554; G11B 11/1058; G11B 7/1384; G11B 7/1206; G11B 5/3116; G11B 5/3146
USPC .......... 369/13.33, 13.32, 13.24, 13.14, 13.03, 369/13.02, 13.12, 13.13, 13.22, 13.01, 369/13.35, 112.27; 360/59, 125.31, 125.75
See application file for complete search history.

(56) References Cited

U.S. PATENT DOCUMENTS

| 8,488,419 | B1 * | 7/2013 | Jin et al. ............... 369/13.32 |
| 8,498,183 | B1 | 7/2013 | Sasaki et al. |
| 8,576,673 | B2 | 11/2013 | Ostrowski et al. |
| 8,599,656 | B2 * | 12/2013 | Jin et al. ............... 369/13.33 |
| 8,654,618 | B1 * | 2/2014 | Liu et al. ............... 369/13.33 |
| 8,755,256 | B2 * | 6/2014 | Maletzky et al. ......... 369/13.33 |
| 2008/0204917 | A1 | 8/2008 | Nakamura et al. |

OTHER PUBLICATIONS

Co-pending U.S. Appl. No. 14/268,407, filed May 2, 2014, Laminated Plasmon Generator with Cavity Process, by Xuhui Jin, et al., 53 pgs.
Co-pending U.S. Appl. No. 14/041,607, filed Sep. 30, 2013, "Thermally-Assited Magnetic Recording Head Having a Heat Sink," by Hironori Araki, 44 pgs.

* cited by examiner

*Primary Examiner* — Ali Neyzari
(74) *Attorney, Agent, or Firm* — Saile Ackerman LLC; Stephen B. Ackerman

(57) ABSTRACT

A TAMR head is disclosed wherein a heat sink with a bilayer configuration surrounds the main pole. There is a planar plasmon generator (PPG) with a front peg portion and a larger back portion between a waveguide and a main pole bottom surface. The PPG generates a surface plasmon mode and heats a spot on a magnetic medium during a write process. A first heat sink layer made of Au contacts a back section of the top surface in the PPG back portion to enable efficient dissipation of heat away from the PPG. The second heat sink layer may be Ru and serves as a barrier between the main pole and first heat sink layer to prevent Au migration into magnetic material, and is thermally stable to at least 450° C. to prevent a thermal breakdown of the heat sink material in proximity to the PPG front end.

30 Claims, 14 Drawing Sheets

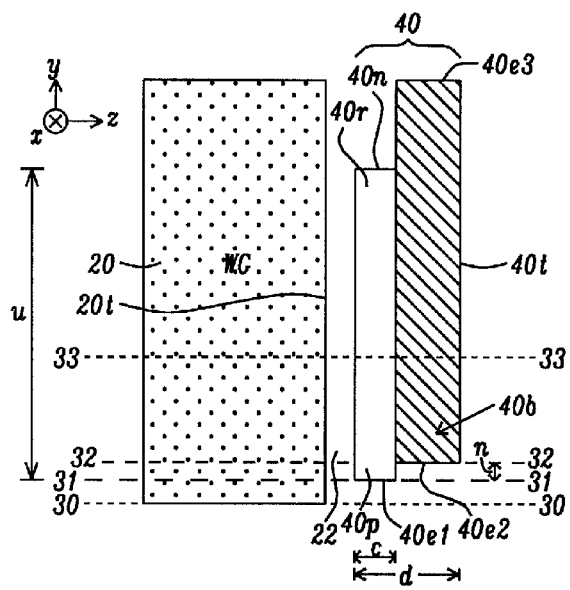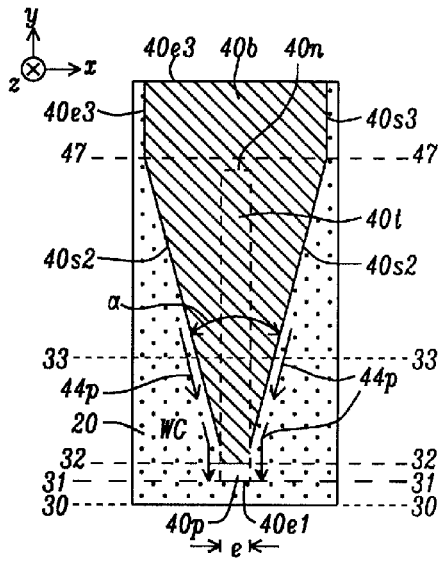
FIG. 4a   FIG. 4b
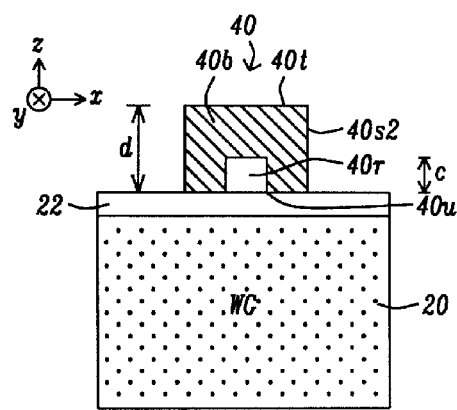
FIG. 4c

HEAT SINK FOR THERMALLY ASSISTED MAGNETIC RECORDING (TAMR)

RELATED PATENT APPLICATIONS

This application is related to U.S. Pat. No. 8,488,419, U.S. Pat. No. 8,599,656, Ser. No. 14/268,407, filed on May 2, 2014, and Ser. No. 14/041,607, filed on Sep. 30, 2013, all assigned to a common assignee and herein incorporated by reference in their entirety.

TECHNICAL FIELD

The present disclosure relates to magnetic read/write heads based on thermally assisted magnetic recording (TAMR) and in particular to a structure in which a heat sink with dual layer construction adjoins the sides of a main pole and top surface of a planar plasmon generator (PPG) to provide improved reliability even with localized temperatures of up to 450° C. around a front end of the PPG.

BACKGROUND

TAMR is expected to be one of the future generations of magnetic recording technologies that will enable recording at ~1-10 Tb/in² data densities. TAMR involves raising the temperature of a small region of the magnetic medium to near its Curie temperature where both of its coercivity and anisotropy are significantly reduced and magnetic writing becomes easier to achieve even with weak write fields characteristic of small write heads in high recording density schemes. In TAMR, optical power from a light source is converted into localized heating in a recording medium during a write process to temporarily reduce the field needed to switch the magnetizations of the medium grains. Thus, with a sharp temperature gradient of TAMR acting alone or in alignment with a high magnetic field gradient, data storage density can be further improved with respect to current state of the art recording technology.

In addition to the components of conventional write heads, a TAMR head also includes an optical waveguide (WG) and a plasmon generator (PG). The waveguide serves as an intermediate path to guide laser light from a source to the PG where the light optical mode couples to the propagating plasmon mode of the PG. After the optical energy is transformed to plasmon energy with energy transmission along the PG, it is concentrated at the medium location where heating is desired. ideally, the heating spot is correctly aligned with the magnetic field from the write head to realize optimum TAMR performance.

As increased recording density is required in hard disk drives (HDD), thin-film magnetic heads must deliver improved performance. Thin-film heads with a composite structure in which a magnetoresistive (MR) sensor device is laminated with a magnetic recording device are widely used. These two devices read and write data signals, respectively, from and onto magnetic disks that are magnetic recording media.

A magnetic recording medium may be considered a discontinuous body wherein magnetic fine particles are assembled. One recording bit comprises a plurality of magnetic fine particles each having a single domain structure. Therefore, in order to enhance recording density, it is necessary to shrink magnetic fine particle size thereby reducing irregularities at boundaries of recording bits. However, a decreased volume that is associated with smaller magnetic fine particle size tends to cause a deterioration of thermal stability in magnetization which is a problem.

An index of thermal stability in magnetization is related to $K_U V/k_B T$ where $K_U$ is the magnetic anisotropy energy of a magnetic fine particle, V is the volume of one magnetic fine particle, $k_B$ is the Boltzmann constant, and T is the absolute temperature. A smaller magnetic fine particle size only reduces V which lowers $K_U V/k_B T$ and worsens thermal stability. Although $K_U$ may be increased to counteract this problem, a larger $K_U$ increases the coercivity of the magnetic recording medium. One must consider that the writing magnetic field intensity caused by a magnetic head is substantially determined by the saturated magnetic flux density of a soft magnetic material constituting a magnetic pole within the head. As a result, no writing is accomplished if the coercivity exceeds a permissible value determined by the limit of writing magnetic field intensity.

A solution to the aforementioned thermal stability problem is needed in a TAMR scheme where heat is applied to a magnetic recording medium immediately before applying a writing magnetic field while using a magnetic material having a large $K_U$ value so as to enable writing with lowered coercivity. The TAMR scheme is roughly classified into magnetic dominant recording and optical dominant recording. In magnetic dominant recording, writing is attributed to an electromagnetic coil component while the radiation diameter of light is greater than the recording width. In contrast, for optical dominant recording, writing is attributed to a light-radiating part while the radiation diameter of light is substantially the same as the track width (recording width). Thus, magnetic dominant recording and optical dominant recording impart space resolution to a magnetic field and light, respectively.

In a TAMR recording device, light is emitted from a source such as a semiconductor laser into an optical waveguide that is surrounded by a cladding material. Light is focused by the plasmon generator at the end of the waveguide to heat the surface of the magnetic medium. Since the focused light power is intense, temperatures may reach 450° C. in the vicinity of the PG and cause reliability issues with PG structures made of Au that is typically employed because of its high thermal transmission property and high plasmon propagation efficiency. A new TAMR recording head design is needed, especially in the vicinity of the PG, to substantially increase thermal stability of the PG and adjacent components, and thereby improve device reliability at elevated temperatures.

SUMMARY

One objective of the present disclosure is to provide improved reliability of a TAMR head, especially in the heat sink structure surrounding the main pole and in contact with a top surface of a planar plasmon generator (PPG) that is proximate to the air bearing surface (ABS).

A second objective of the present disclosure is to provide a fabrication sequence for forming the improved TAMR design according to the first objective.

According to one embodiment of the present disclosure, these objectives are achieved with a TAMR recording head structure wherein a PPG is formed between a main pole and a waveguide at the ABS. The PPG has a small peg portion surrounded by dielectric material at the ABS where the dielectric layer forms a gap between the peg and a bottom surface of the main pole. There is also a larger PPG back portion adjoining a peg back end that has a planar top surface and is recessed from the ABS. A front section of the planar top surface is separated by a non-magnetic barrier layer from the main pole while a back section of the planar top surface contacts a first heat sink layer. The heat sink is a composite with a second heat sink layer comprised of a metal with thermal stability to at least 450° C. adjoining the sides and back side of a main pole lower portion, and a first heat sink layer made of a noble metal and contacting the planar top surface of the PPG back portion. The second heat sink layer acts as a barrier to block Au or Ag migration from the first heat sink layer into the main pole, and serves as a spacer to separate the peg and front side of the PPG back portion from the first heat sink layer to prevent a thermal breakdown in the noble metal due to elevated temperatures. The PPG may be a single metal such as Au, Ag, or Cu, or may be comprised of two metals or alloys including a noble metal, Au for example, that forms the bulk of the PPG back portion to provide excellent optical efficiency, and a second metal in the peg that is selected from Ru, Cr, Pd, Pt, Ti, W, Ta, Fe, Co, Ni, or alloys thereof for low atom mobility, high thermal stability, good mechanical hardness, and good adhesion to surrounding dielectric layers.

The peg has a rod-like shape that extends in a lengthwise direction which is perpendicular to the ABS, and preferably has a rectangular shape from a top-down view, and a square, rectangular, or trapezoidal shape from an ABS view. A bottom side thereof is separated from the waveguide by a first gap distance. A top side of the peg is a second gap distance from a leading edge of the main pole at the ABS. The larger PPG back portion is recessed from the ABS by 5 to 150 nm and has a substantially triangular or parabolic shape from a top-down view wherein a back end thereof has a wider cross-track dimension than a front end which adjoins the peg. Furthermore, the PPG back portion has a greater width in a cross-track direction and a greater thickness in a down-track direction than the peg. A bottom peg surface is preferably formed along the same plane as a bottom surface of the PPG back portion.

The optical waveguide extends from the ABS in a lengthwise direction perpendicular to the ABS and parallel to the bottom surface of the PPG. The waveguide captures light from a light source near the back end of the TAMR head and propagates the light toward the ABS. A portion of the light energy is transferred to the surface plasmon (SP) mode along the PPG by evanescent coupling and is then propagated to the ABS through the peg before being projected onto a magnetic medium for localized heating during a write process. At the ABS, the SP mode is confined around the free standing peg that is surrounded by dielectric material and heats the media locally while the head flies over the media surface. The spot size of the SP mode on the media depends on the dimension of the peg, the spacing between the ABS and media recording layer, and thermal properties of the media layers. Optical spot size can be scaled down by reducing the cross-track and/or down-track dimensions of the peg at the ABS.

A key feature of the present disclosure is the composition of the composite heat sink and its configuration adjacent to the main pole and above the PPG. The second heat sink layer may be Ru and is responsible for structural stability at temperatures up to 450° C. while the first heat sink layer has a high thermal conductivity property desired for a heat sink. The first heat sink layer contacts a top surface of the PPG back portion only along a back section thereof, and does not interface with any part of the main pole thereby preventing Au migration into magnetic material.

The present disclosure is also a method of fabricating a TAMR head including a PPG and overlying composite heat sink as described previously. A waveguide, cladding layer, and PPG including a peg and PPG back portion are sequentially formed on a substrate by using a conventional series of process steps. The PPG back portion is separated from an eventual ABS by the peg and a dielectric layer, and has a top surface that is coplanar with a top surface of the dielectric layer. Thereafter, a barrier layer is formed on a front section of the PPG back portion and on a section of the dielectric layer that is above the peg. Next, a continuous first heat sink layer such as Au that surrounds the barrier layer is deposited on regions of the dielectric layer adjacent to the ABS and on a back section of the PPG back portion. A conformal second heat sink layer that is Ru or the like is then deposited on the first heat sink layer and on the barrier layer. Then a hard mask layer is deposited on the second heat sink layer to form a bilayer stack. A first opening is formed in the bilayer stack above the peg that exposes a portion of the barrier layer top surface. The first opening has a cross-track width at the eventual ABS and has a top-down shape that corresponds to the desired shape and size of a subsequently deposited main pole bottom portion. After a photoresist layer is coated and patterned on the hard mask layer to form a second opening that uncovers the first opening and adjacent sections of the hard mask layer, a magnetic material is deposited to fill the first opening and a substantial portion of the second opening. The photoresist layer and overlying magnetic material are removed by a well-known photoresist strip method. A chemical mechanical polish (CMP) process may then be employed to remove the hard mask and upper portions of the second heat sink layer and magnetic layer to form a top surface of the second heat sink layer that is coplanar with a top surface of the magnetic layer which is now called the main pole bottom portion. A top surface of the second heat sink layer remains over the first heat sink layer such that the second heat sink layer separates the sides and back end of the main pole bottom portion from the first heat sink layer. Finally, a main pole upper portion is formed above the main pole bottom portion and on the second heat sink layer.

BRIEF DESCRIPTION OF THE DRAWINGS

FIGS. 4a-4c are down-track cross-sectional, top-down, and recessed cross-track cross-sectional views, respectively, of a hybrid PPG with a peg and back portion according to another embodiment of the present disclosure.

DETAILED DESCRIPTION

Figure 1:
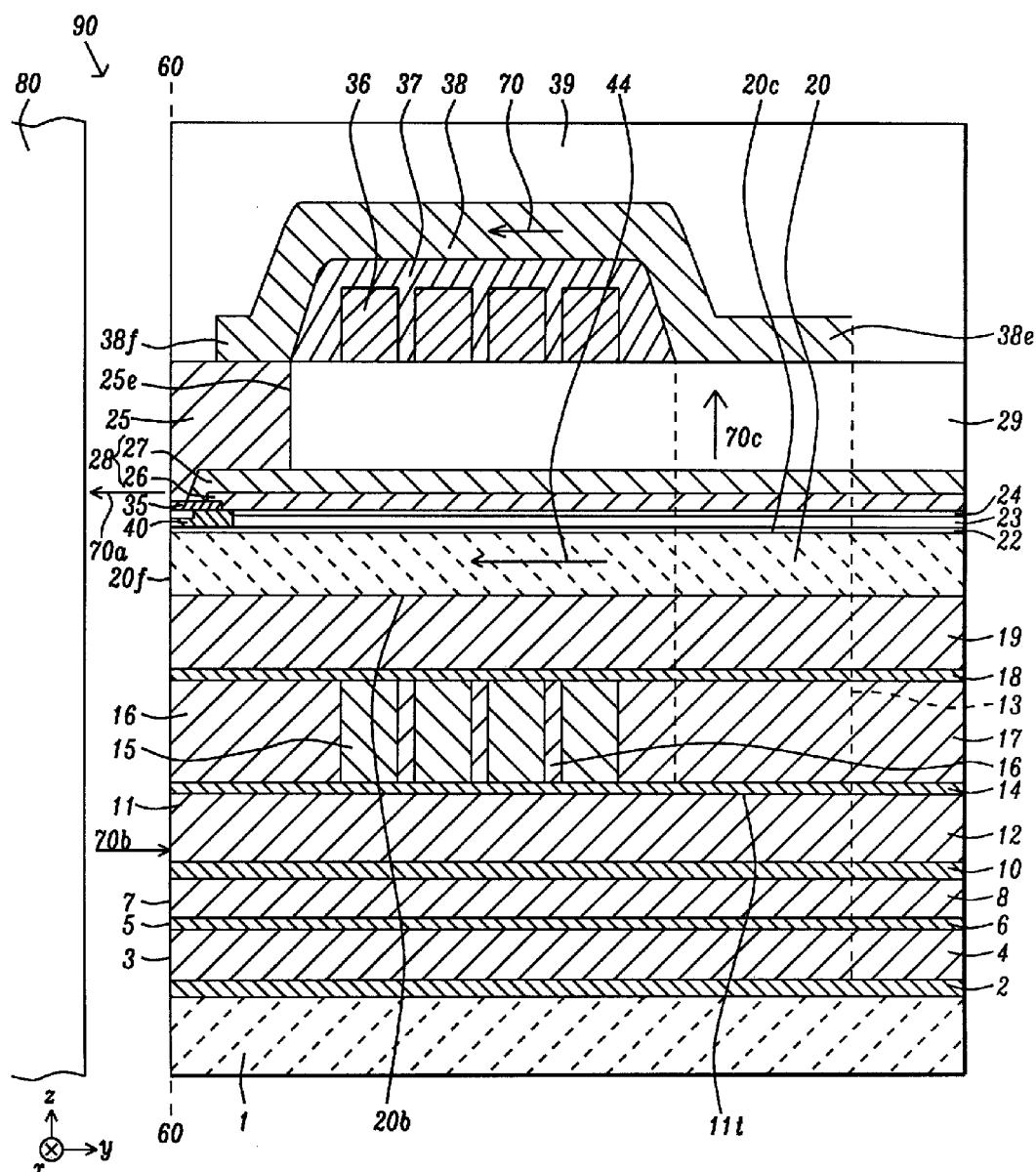
FIG. 1 is a down-track cross-sectional view showing a thermally assisted magnetic recording (TAMR) head according to an embodiment of the present disclosure.

The present disclosure relates to a TAMR head wherein a bilayer heat sink configuration is employed to enhance reliability by surrounding the main pole sides with a thermally stable heat sink material that also prevents migration of a noble metal such as Au from a first heat sink layer into the main pole layer. The first heat sink layer is recessed from a front end of the PPG where heating is greatest to avoid a thermal breakdown therein while maintaining its heat dissipation efficiency. In the drawings, the z-axis direction is defined as the down-track direction, the x-axis corresponds to the cross-track direction, and the y-axis extends perpendicular to the ABS and toward a back end of the TAMR head. The terms sides and sidewalls may be used interchangeably when referring to various layers in the TAMR head.

In FIG. 1, a TAMR head 90 according to one embodiment of the present disclosure is illustrated. The TAMR head flies over a magnetic medium 80 in a z-axis direction during a write or read process, and has an air bearing surface (ABS) 60-60 facing the magnetic medium.

The bottommost layer in the TAMR head is a substrate 1 that is typically alumina-TiC (AlTiC). Above the substrate are sequentially formed an insulation layer 2, bottom (S1) shield 3, insulation layer 6, and top (S2) shield 7. Insulation layer 4 surrounds the bottom shield and insulation layer 8 surrounds the top shield. The insulation layers may be comprised of alumina or another dielectric material. A magnetoresistive (MR) sensor 5 is formed at the ABS and within insulation layer 6. The MR sensor typically includes two ferromagnetic (FM) layers separated by a non-magnetic spacer (not shown) wherein a first FM layer has a fixed magnetization direction, and the second FM layer has a magnetization that rotates between a parallel and anti-parallel direction with respect to the fixed magnetization when influenced by an external magnetic field. The MR sensor has one of two resistance values when a sense current is applied in a current perpendicular to plane (CPP) direction, depending on the magnetization direction of the second FM (free) layer. The non-magnetic spacer may be a metal to yield a giant magnetoresistive (GMR) element, or a dielectric material such as MgO to give a tunneling magnetoresistive (TMR) element. Layers 2-7 represent a read head component of the TAMR head.

The TAMR head further includes a non-magnetic layer 10, return pole 11, and insulation layer 14 that are sequentially formed on the top shield 7. The return pole is surrounded by insulation layer 12. There is a magnetic coupling layer 13 proximate to a back end of the TAMR head that extends upward in a z-axis direction from a top surface 11t of the return pole to a yoke 38 that in turn connects to a portion of top surface on magnetic pole layer 25 hereafter called the main pole that is proximate to the ABS 60-60. A coil 15 made of a conductive material such as Cu, and comprised of a plurality of turns (four are pictured) that are in a spiral shape from a top-down view (not shown) is disposed on a top surface of insulation layer 14 between the magnetic coupling layer 13 and the ABS. An insulation layer 16 such as a photoresist is formed between adjacent turns of the coil, and between the coil and ABS while another insulation layer 17 surrounds the coil. Yet another insulation layer 18 is formed on the top surfaces of the coil 15, insulation layer 16, and insulation layer 17. Bottom portions of magnetic coupling layer 13 are embedded in insulating layers 14, 17.

Above insulation layer 18 are successively formed a cladding layer 19, waveguide 20, and cladding layer 22. Another cladding layer 21 (FIG. 2a) surrounds the waveguide. Cladding layers have a refractive index lower than that of the waveguide and may comprise silicon oxide, alumina, silicon oxynitride, silicon nitride, or $MgF_2$. The waveguide may be tantalum oxide ($Ta_2O_5$), for example. The waveguide has an end 20a at the ABS, a bottom surface 20b, and a top surface 20c for transmitting evanescent light. A light source (not shown) such as a laser is affixed to a back end of substrate 1 and generates light 44 which is directed into the waveguide and transmitted toward the ABS 60-60.

A portion of the light is coupled to an overlying planar plasmon generator (PPG) 40 where it excites a plasmon mode. The plasmon energy mode 44p shown in FIG. 4b propagates to the ABS and emerges from the PPG to heat a localized spot on magnetic medium 80 and thereby enable a lower magnetic field from the main pole to write data during a write process. The PPG may be comprised of a single metal such as Au as we disclosed in U.S. Pat. No. 8,599,656, or may be a composite that contains two or more metals or alloys. In one embodiment, the PPG may have a hybrid structure as described in U.S. Pat. No. 8,488,419 where a front portion called the peg is made of a first metal, and a larger portion recessed behind the peg with respect to the ABS is comprised of a second metal. In yet another embodiment as we have previously disclosed in related patent application Ser. No. 14/268,407, the PPG may include a laminated stack of layers.

Referring again to FIG. 1, PPG 40 is adjoined on the sides thereof including the back side facing away from the ABS by a stack of dielectric layers 23, 24 that may be comprised of the same material as in cladding layers 19, 21, 22. Dielectric layer 24 also forms a gap between a top surface of a front portion (peg) of PPG 40 and an overlying barrier layer 35 at the ABS 60-60. The barrier layer extends from the ABS toward a back end of the TAMR head and covers a front section of top surface on a PPG back portion where the PPG top surface is coplanar with a top surface of dielectric layer 24. The barrier layer is selected from Zr, Pd, Cu, Ni, Fe, Co, Ta, TaOx, SiO$_2$, Al$_2$O$_3$, TaOx, and SiON, and is advantageously used as an etch stop layer during the fabrication of composite heat sink 28 as described later.

A key feature of the present disclosure is composite heat sink 28 that has a first layer 26 made of a noble metal such as Au or Ag, and a second layer 27 that is one of Ru, Zr, Pd, Cu, Ni, Fe, Co, or Ta. First heat sink layer 26 is useful for having a high thermal conductivity property in order to efficiently disperse heat that is generated by the plasmon mode away from the PPG 40 thereby improving thermal stability therein. Second heat sink layer 27 serves as a barrier between the first heat sink layer and main pole 25 in order to prevent Au or Ag diffusion into the magnetic material and subsequent degradation of writing capability. The main pole, yoke 38, and magnetic coupling layer 13 may be formed of a magnetic alloy such as CoFe, CoFeNi, or NiFe.

An important aspect of the present disclosure is that the second heat sink layer has thermal stability to at least 450° C. and contacts the main pole to improve reliability of the TAMR head while the first heat sink layer is recessed from a PPG front end and does not contact the main pole. Thus, the top surface of the composite heat sink 28 and sides contacting the main pole are comprised only of second heat sink layer 27.

Returning to FIG. 1, the TAMR head in the preferred embodiment further includes an insulation layer 29 formed on a top surface of heat sink layer 27 and extending from a back side of main pole 25 toward a back end of the device. Insulation layer 29 preferably has a top surface that is coplanar with a top surface of the main pole and of the magnetic coupling layer 13. A coil 36 with a plurality of turns is formed on insulation layer 29 wherein adjacent turns are separated by a dielectric layer 37 that is typically a photoresist layer. The yoke 38 overlays on dielectric layer 37, and a front portion 38f thereof is recessed from the ABS 60-60 and contacts a top surface of the main pole while a back end portion 38e adjoins the top surface of the magnetic coupling layer. As a result, a magnetic flux pathway is formed whereby flux 70 is generated by coil 36, exits the TAMR head as magnetic field 70a that writes data onto a magnetic bit (not shown) in magnetic medium 80, returns as flux 70b in return pole 11, and cycles back to the yoke through the magnetic coupling layer as flux 70c. As an uppermost layer in the TAMR head, a protective layer 39 made of alumina, for example, is formed on a front section of main pole, on yoke 38, and on a back section of insulation layer 29.

Figure 2A:
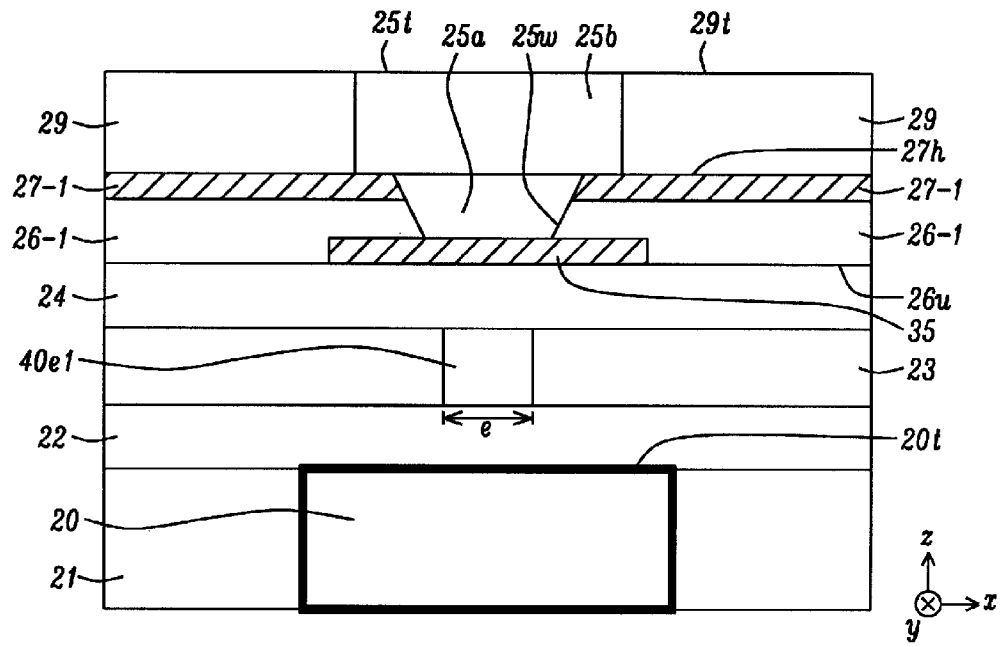
FIGS. 2a-2b are ABS and down-track cross-sectional views, respectively, of a portion of a TAMR head having a bilayer heat sink structure adjoining a main pole that is currently fabricated by the inventors.

Referring to FIG. 2a, an ABS view is shown of an enlarged portion of a TAMR head that is currently fabricated by the inventors using a heat sink design previously disclosed in related patent application Ser. No. 14/041,607. Waveguide 20 is surrounded by cladding layer 21, and a second cladding layer 22 contacts a planar top surface 20t of the waveguide. End 40e1 of the PPG is exposed at the ABS and is surrounded by dielectric layer 23. A second dielectric layer 24 contacts a top surface of the end (peg) and forms a gap between the peg and barrier layer 35. The barrier layer separates the second dielectric layer from a main pole bottom portion 25a, and has a bottom surface that is coplanar with a bottom surface 26u of a first heat sink layer 26-1. Sides 25w of the main pole bottom portion contact a composite heat sink having the a lower first heat sink layer 26-1 that is a laminate including an Au layer, and upper heat sink layer 27-1 that is Ru, for example. Preferably, a top surface of the upper heat sink layer is coplanar with a top surface of bottom portion 25a. A main pole upper portion 25b overlays on the bottom portion 25a and on a section of top surface 27t that is proximate to sides 25w. The main pole layer has a top surface 25t that is coplanar with a top surface 29t of insulation layer 29.

Figure 2B:
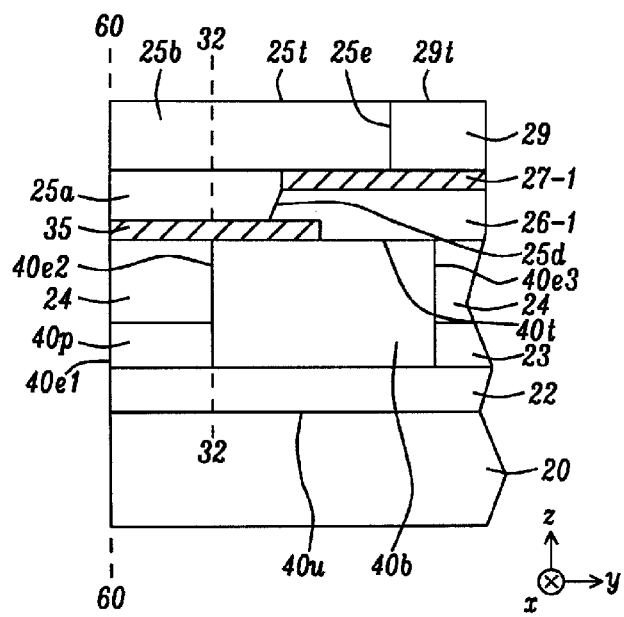

Referring to FIG. 2b, a down-track cross-sectional view is provided of the TAMR head structure in FIG. 2a. PPG 40 is shown with a peg 40p at the ABS and a larger back portion 40b that is recessed from the ABS 60-60. The peg has a front side 40e1 at the ABS and a back side along plane 32-32 that also includes a front side 40e2 of the back PPG portion. The peg and larger back portion have a common bottom surface 40u that extends from the ABS to back side 40e3. Barrier layer 35 contacts a top surface of dielectric layer 24 at the ABS and extends over a front section of PPG top surface 40t. The main pole bottom portion 25a has a back side 25d that adjoins composite heat sink stack 26-1/27-1.

We have found that temperatures in the PPG approach 450° C., especially in peg 40p and in the larger back portion proximate to plane 32-32. As a result, Au in lower heat sink layer 26-1 tends to migrate through back side 25e into the main pole bottom portion 25a and degrades the magnetic property therein. Once the Au heat sink layer is damaged, the heat sink loses it capacity to dissipate heat away from the PPG, and TAMR head reliability is substantially diminished. We discovered that by redesigning the heat sink structure with a bilayer configuration described later with regard to FIGS. 13a-16, the heat sink thermal instability and Au migration issues have been successfully corrected to provide a high performance TAMR head with sufficient reliability for advanced products.

Figure 3A:
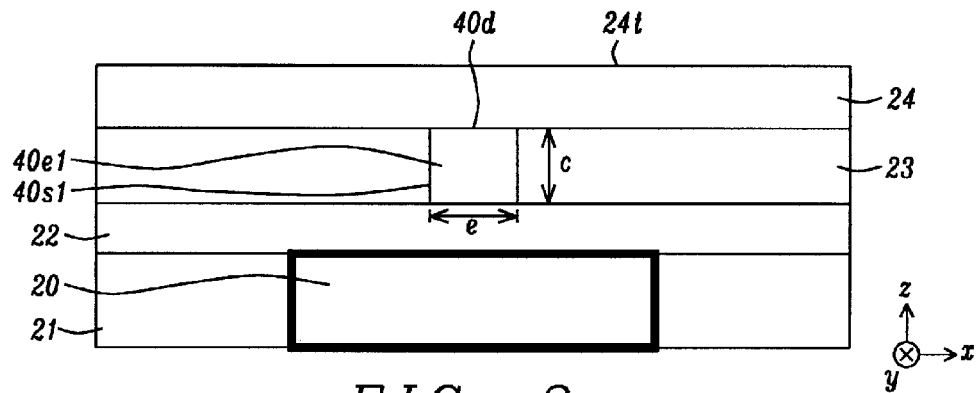
FIGS. 3a-3c are ABS, down-track cross-sectional, and top-down views, respectively, of a planar plasmon generator (PPG) formed within a dielectric layer and above a waveguide according to an embodiment of the present disclosure.
Figure 3B:
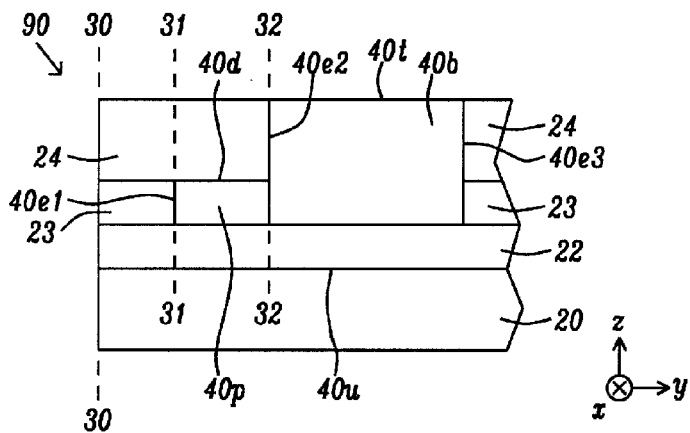
Figure 3C:
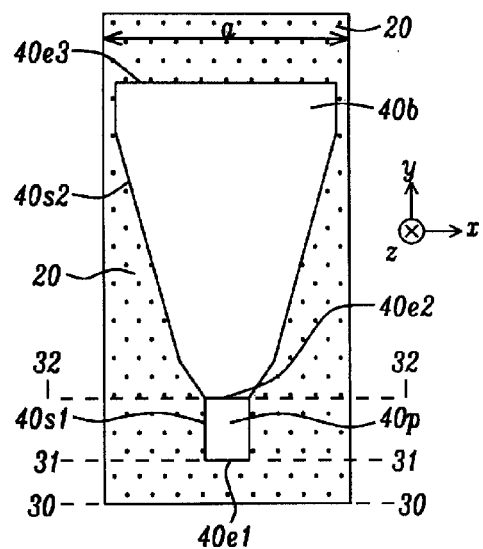
Figure 15A:
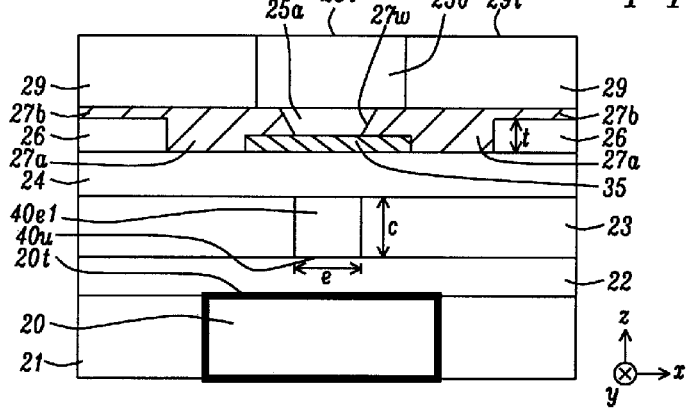
FIG. 15a and FIG. 15b show the TAMR structures in FIG. 14a, and FIG. 14b, respectively, after a main pole upper portion is formed in the insulation layer.
Figure 15B:
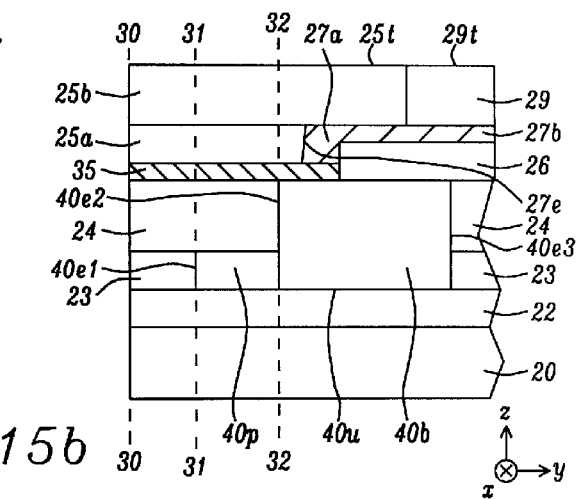
Figure 16:
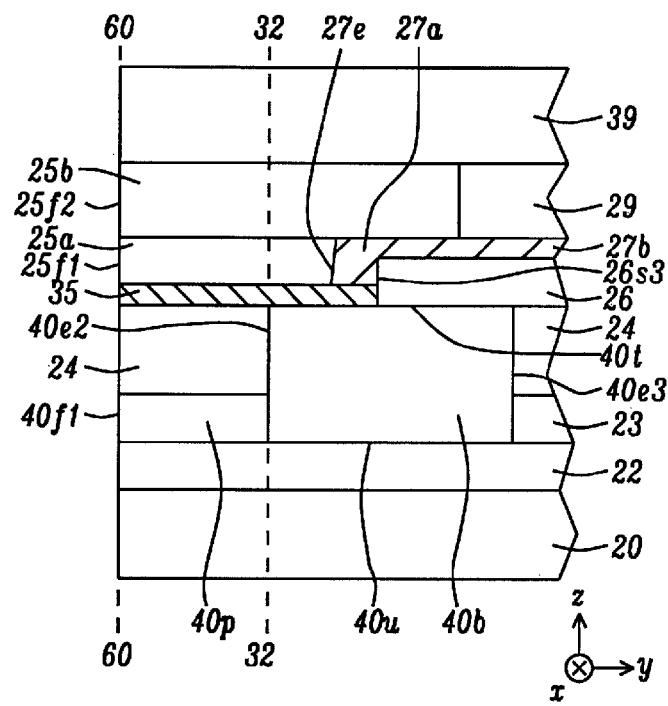
FIG. 16 is a down-track cross-sectional view of the TAMR head in FIG. 15b after all layers have been deposited and a lapping process is completed according to a method of the present disclosure.

The present disclosure is also a method of fabricating the TAMR head in FIG. 1, and in particular, a process sequence for forming the composite heat sink and surrounding layers above the PPG and waveguide depicted in FIGS. 15a-15b, and in FIG. 16. In FIGS. 3a-3c, a starting point for the formation of the composite heat sink 28 is providing a PPG on a stack comprising a waveguide 20 and cladding layer 22 as described previously. As depicted in a cross-sectional view in FIG. 3a taken along plane 31-31 in FIG. 3b, the PPG peg has an end 40e1 with a cross-track width e and a down-track thickness c wherein bottom surface 40u contacts a top surface of cladding layer 22, and top surface 40d contacts dielectric layer 24. Sides 40s1 adjoin dielectric layer 23. The top dielectric layer has a planar top surface 24t typically formed by a chemical mechanical polish (CMP) process.

With regard to FIG. 3b, a down-track cross-sectional view is illustrated and includes a plane 30-30 formed between TAMR head structure 90 and an adjacent TAMR head (not shown). It should be understood that a plurality of TAMR heads are simultaneously constructed on a substrate and that upon completion of the TAMR heads, dicing and lapping processes are performed to separate adjacent TAMR heads and form an ABS for TAMR head 90 between plane 31-31 and plane 32-32. Thus, ABS 60-60 in FIG. 1 is formed as a plane that is parallel to the aforementioned planes during a final step in the fabrication process, and ABS placement is determined by the desired distance (height) of top surface 40d along the y-axis direction. The thickness of peg 40p in a down-track direction is substantially less than the thickness of the PPG back portion 40b between bottom surface 40u and top surface 40d.

FIG. 3c depicts a top-down perspective of the TAMR head structures in FIGS. 3a-3b with dielectric layers 23-24 and cladding layer 22 removed in order to indicate the overlay of the PPG on waveguide 20. Preferably, the underlying waveguide has a cross-track width a that is greater than the cross-track width of back side 40e3. For example, cross-track width a may be about 0.6 microns. According to one embodiment, the PPG has sides 40s2 and back side 40e3 that form a substantially triangular shape in the larger back portion 40b between front side 40e2 at plane 32-32 and back side 40e3. The cross-track distance between sides 40s2 becomes increasingly larger with increasing distance from peg 40p. Each side does not necessarily have to be formed along a plane which means there may be a certain degree of curvature in sides 40s2. Typically, peg 40p has a rectangular shape wherein sides 40s1 are aligned perpendicular to plane 31-31. The peg has a smaller cross-track width than the PPG back portion that is recessed behind plane 32-32 with respect to peg front side 40e1.

According to another embodiment shown in FIG. 4a that encompasses a hybrid PPG structure we have disclosed in U.S. Pat. No. 8,488,419, PPG 40 comprises a first metal layer 40r in the shape of a rod that extends a substantial distance beyond plane 32-32 to a back end 40n that is a distance u from plane 31-31. The first metal layer is preferably comprised of Ru, Cr, Pd, Pt, Ti, W, Ta, Fe, Co, Ni, or alloys thereof to provide low atom mobility, good thermal robustness and mechanical hardness, and superior resistance to corrosion. A front portion of the first metal layer is designated as peg 40p. The larger back portion 40b of the hybrid PPG is made of a second metal layer such as Au, Ag, Cu, or alloys thereof for excellent optical efficiency. The peg has a down-track thickness c, and the PPG back portion has a down-track thickness d. A front side 40e2 of the larger back portion is recessed a distance n of about 5 to 150 nm from plane 31-31.

According to one embodiment depicted in the top-down view in FIG. 4b, the second metal layer that forms back portion 40b has sides 40s2 that together with back side 40e3 provide a substantially triangular shape. In some embodiments, sides 40s3 may be included between an end of side 40s2 at plane 47-47 and back side 40e3. In other embodiments, the rod-like layer 40r may extend beyond plane 47-47 such that end 40n is located between sides 40s3. Sides 40s2 may form an angle α with respect to each other so that the plasmon mode 44p is focused to a narrow region around peg 40p.

A cross-sectional view of the PPG structure along plane 33-33 in FIG. 4b is depicted in FIG. 4c. The rod-like layer 40r is enclosed on the sides and along top surface by the second metal layer represented by PPG back portion 40b. Usually, thickness d is at least two times greater than thickness c. Planar top surface 40t may be formed by a CMP process. The dielectric layer adjoining the sides 40s2 is not shown in this view.

Figure 5:
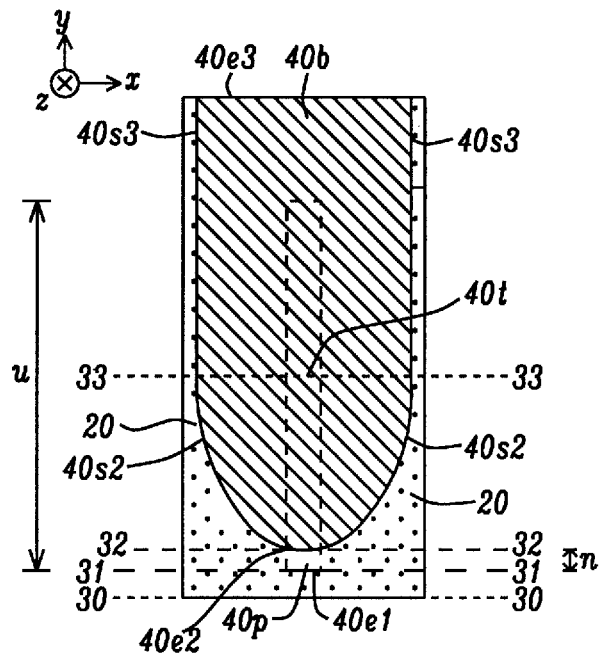
FIG. 5 is a top-down view of the hybrid PPG in FIG. 4b wherein the back portion has an elliptical shape.

In FIG. 5, a top-down view of an alternative hybrid PPG design is shown wherein sides 40s2 along PPG back portion 40b have substantial curvature similar to an elliptical shape instead of the essentially planar sides 40s2 in the FIG. 4b embodiment. Otherwise, the features of the embodiment in FIGS. 4a-4c are retained such that the cross-sectional view in FIG. 4c also applies to the PPG structure in FIG. 5 along plane 33-33.

Figure 6A:
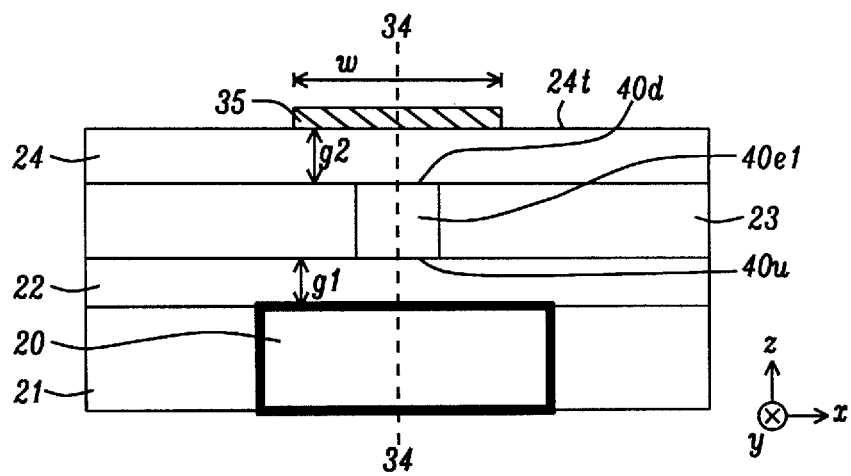
FIGS. 6a, 6b, and 6c depict a process step according to an embodiment of the present disclosure wherein a barrier layer is formed above the PPG and contacts a top surface of a back PPG portion in FIGS. 3a, 3b, and 3c, respectively.
Figure 6B:
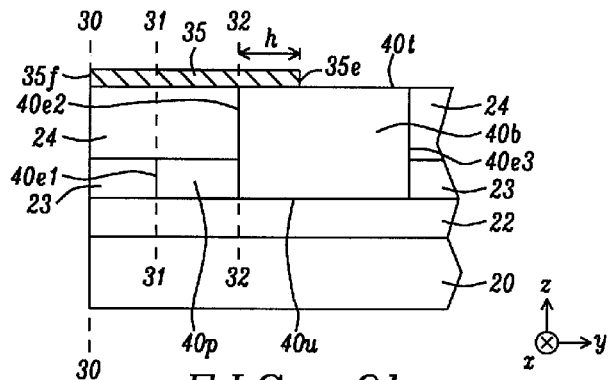
Figure 6C:
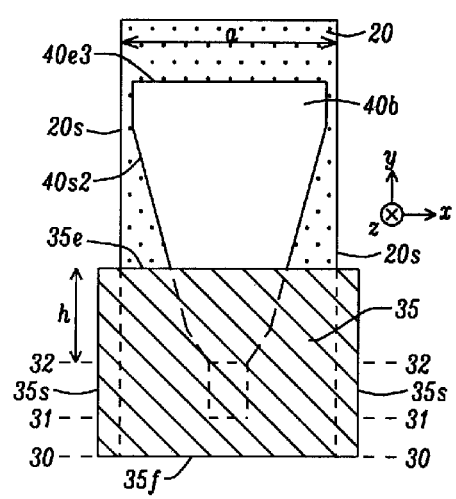

The TAMR head up to this point may be formed by conventional methods known by those skilled in the art. The next step according to a method of fabricating the TAMR head in FIG. 1 is illustrated in FIGS. 6a-6c wherein a barrier layer 35 is formed on a top surface 24t of dielectric layer 24 and is aligned above peg end 40e1. The barrier layer is made of Zr, Pd, Cu, Ni, Fe, Co, Ta, TaOx, $SiO_2$, $Al_2O_3$, or SiON and preferably has a greater cross-track width w than the cross-track width of peg end 40e1, and that of the main pole bottom portion 25a to be deposited in a subsequent step. Referring to FIG. 6a with a view along plane 31-31 in FIG. 6b, there is a gap distance g2 between the peg top surface 40d and barrier layer 35, and a gap distance g1 between top surface 20t and peg bottom surface 40u wherein each gap distance is preferably in the range of 20 to 30 nm. The barrier layer may be sputter deposited in an opening in a photoresist mask layer (not shown) after a conventional photoresist coating and patterning sequence. The photoresist mask layer is removed prior to the next step. Center plane 34-34 is aligned orthogonal to plane 30-30 and bisects the PPG, waveguide 20, and barrier layer.

In the down-track cross-sectional view in FIG. 6b, barrier layer 35 has a front side 35f at plane 30-30, and eventually at the ABS after a final lapping process, and a back side 35e that extends a distance h of about 300 to 5000 nm along a y-axis direction from plane 32-32 at the front side 40e2 of PPG back portion 40b and toward back side 40e3. It is important that a back section of PPG top surface 40t remain uncovered so that the first heat sink layer may contact a substantial top surface area of the PPG back portion following the next sequence of steps. As a result, there will be sufficient heat flow from the PPG to the first heat sink layer to prevent thermal degradation of the PPG.

From a top-down view in FIG. 6c, the barrier layer 35 has a width in a cross-track direction between sides 35s that is preferably greater than the cross-track width a of waveguide 20. Therefore, the barrier layer overlaps each side 20s of the waveguide. Sides 35s are aligned perpendicular to plane 30-30 which means the barrier has a rectangular shape bounded by front side 35f at plane 30-30, back side 35e, and sides 35s.

Figure 7:
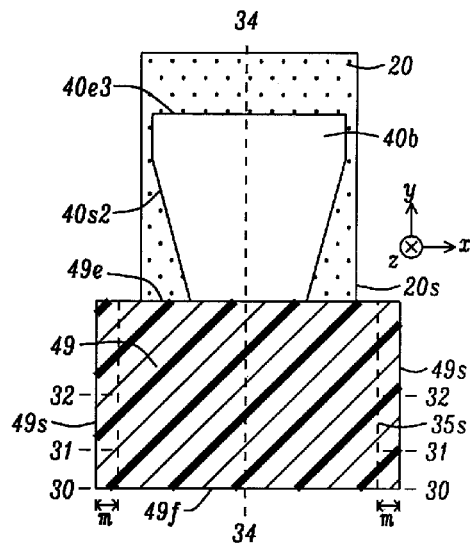
FIG. 7 is a top-down view showing a photoresist mask formed above the barrier layer in FIG. 6c according to a process of the present disclosure.

Referring to FIG. 7, the next step in the fabrication process involves coating and patterning a photoresist mask layer 49 having a front side 49f at the plane 30-30, a back side 49e that preferably overlays on the barrier back side, and two sides 49s that are a greater distance from center plane 34-34 than sides 35s. In one embodiment, there is a cross-track distance m of about 0 to 300 nm between sides 35s and 49s on each side of the center plane.

Figure 8A:
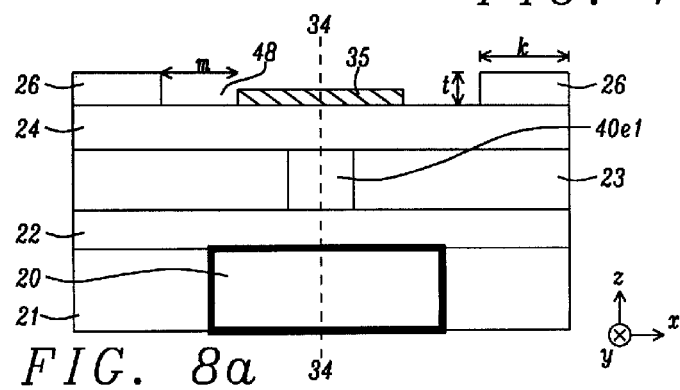
FIGS. 8a, 8b, and 8c show ABS, down-track cross-sectional, and top-down views of the structures in FIGS. 6a, 6b, 6c, respectively, after a first heat sink layer is deposited according to an embodiment of the present disclosure.
Figure 8B:
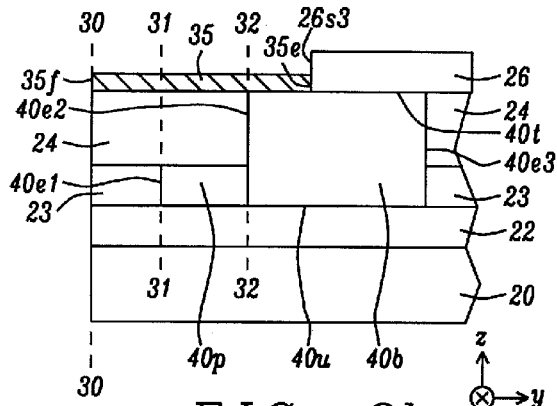
Figure 8C:
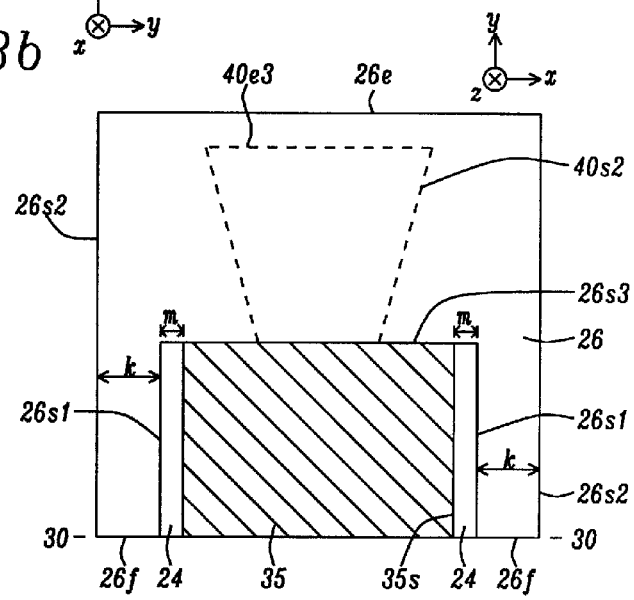

FIGS. 8a-8c depict the TAMR head structure after a following step in which the first heat sink layer 26 preferably made of Au or Ag is sputter deposited on photoresist mask layer 49 and on adjacent regions of PPG back portion 40b and dielectric layer 24. Thereafter, the photoresist mask layer and overlying portion of the first heat sink layer are removed by a well-known lift off process.

As indicated in the cross-sectional view in FIG. 8a, the remaining portion of the first heat sink layer 26 after the photoresist mask layer lift off process has a thickness t in the range of 30 to 80 nm and is formed on dielectric layer 24 and on the top surface 40t of PPG back portion as shown in FIG. 8b. The first heat sink layer extends a distance k of about 1600 to 5000 nm in a cross-track direction from an inner sidewall 26s1 where the inner sidewall is separated from barrier layer 35 on each side of center plane 34-34 by a space 48 with a cross-track dimension m previously described with respect to FIG. 7.

Referring to FIG. 8b, the TAMR head structure in FIG. 8a is shown from a down-track cross-sectional view. First heat sink layer 26 has a side 26s3 that adjoins a back side 35e of the barrier layer at top surface 40t of PPG back portion 40b. Preferably, the first heat sink layer has a thickness greater than the barrier layer thickness. The first heat sink layer contacts a substantial portion of top surface 40t and extends in a y-axis direction toward a back end of the TAMR head and beyond the back side 40e3 of the PPG back portion.

In the top-down view shown in FIG. 8c, the first heat sink layer inner sidewall 26s1 is separated from barrier side 35s by a space having width m where a top surface of dielectric layer 24 is exposed. First heat sink layer side 26s3 contacts both of the inner sidewalls 26s1 and is aligned parallel to plane 30-30. Outer sides 26s2 extend to first heat sink layer back side 26e along a plane that is a greater distance from plane 30-30 than the back side 40e3 of the PPG back portion. Each portion of the first heat sink layer between sidewalls 26s1 and 26s2 has a front side 26f along plane 30-30. The distance between front side 26f and back side 26e may be in the range of 1000 to 3000 nm.

Figure 9A:
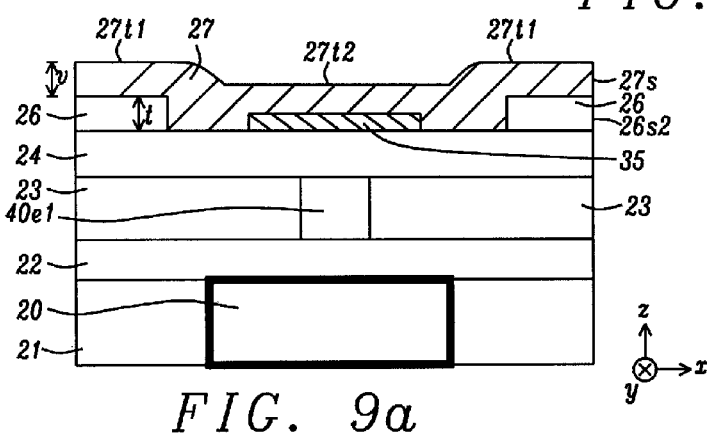
FIGS. 9a and 9b are cross-sectional views of the structures in FIG. 8a and FIG. 8b; respectively, after a second heat sink layer is deposited according to a process of the present disclosure.
Figure 9B:
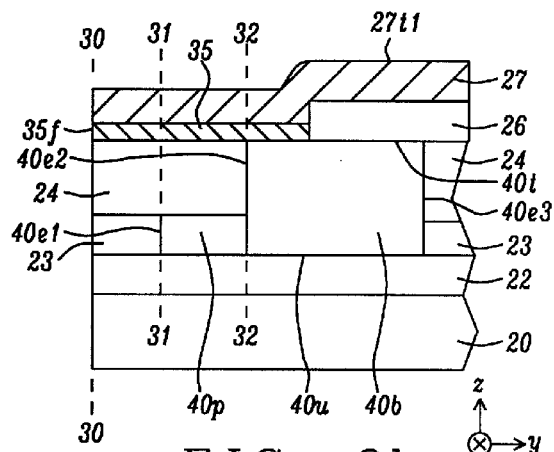

FIGS. 9a-9b depict the TAMR head structure after a subsequent step in the fabrication process where a second heat sink layer 27 is sputter deposited on the first heat sink layer 26, on barrier layer 35, and on dielectric layer 24 between first heat sink layer sidewall 26s1 and adjacent barrier side 35s. As shown with the cross-sectional view in FIG. 9a, the second heat sink layer is preferably Ru and has a thickness v of about 60 to 100 nm that is preferably greater than thickness t of the first heat sink layer. The second heat sink layer has a top surface with sections 27t1 above the first heat sink layer that are a greater distance from dielectric layer 24 than a middle section 27t2 above the barrier layer. Sides 27s may be aligned along the same vertical plane as outer sidewall 26s2 of the first heat sink layer.

In the down-track cross-sectional view in FIG. 9b, the second heat sink layer 27 has a section of top surface 27t1 formed on the portion of first heat sink layer aligned above PPG top surface 40t. As a result, the top surface of the first heat sink layer is completely covered by the second heat sink layer.

Figure 10A:
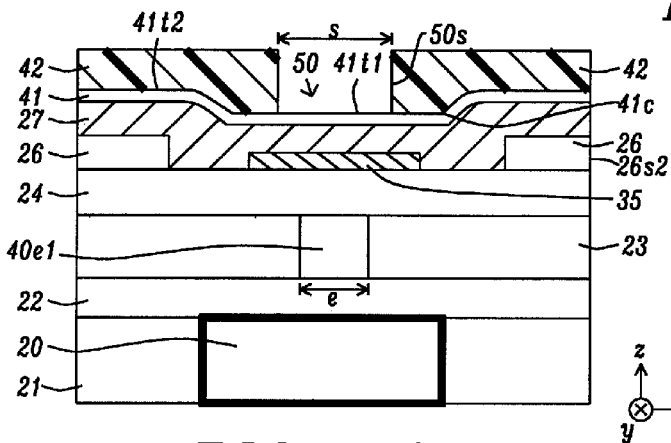
FIGS. 10a, 10b, and 10c are ABS, down-track cross-sectional, and top-down views of the structure in FIGS. 9a-9b showing a hard mask layer formed on the second heat sink layer according to a process step of the present disclosure.
Figure 10B:
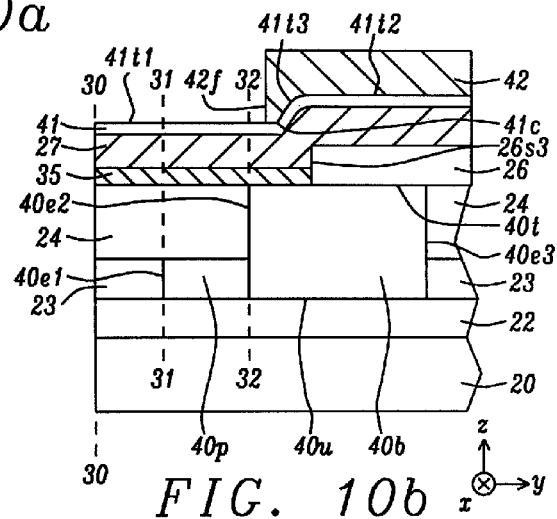
Figure 10C:
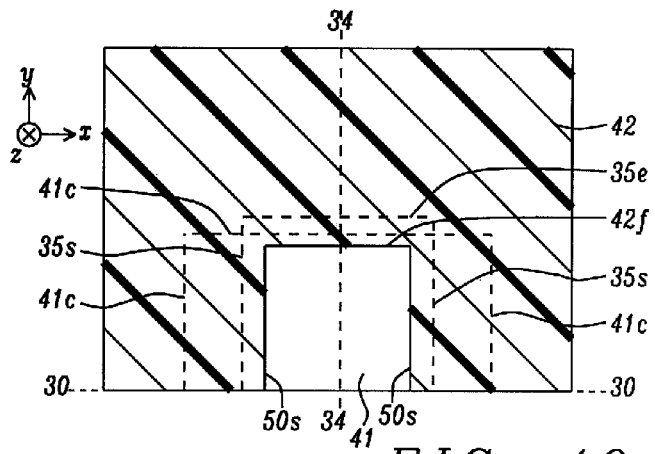

FIGS. 10a-10c illustrate the TAMR head structure following the next sequence in the fabrication process where a hard mask layer 41 comprised of Ta or alumina, for example, is conformally deposited on the second heat sink layer 27. Then, a photoresist layer 42 is coated and patterned by a conventional lithography method to form an opening 50 with sidewalls 50s that are aligned above the barrier layer 35. The opening exposes a portion of top surface 41t1 on the hard mask layer. The opening shown in FIG. 10a has a cross track-width s that is preferably less than the cross-track width of the barrier layer. The hard mask layer has a thickness that is substantially thinner than t and v of the first and second heat sink layers, respectively.

Referring to FIG. 10b, the hard mask has a first planar section with top surface 41t1 above the barrier layer, a second planar section having top surface 41t2 above first heat sink layer 26, and a third curved section 41t3 starting at edge 41c and becoming increasing farther from top surface 40t with increasing distance from plane 32-32 until reaching top surface 41t2. Thus, the first planar section extends from plane 30-30 in a y-axis direction to an edge 41c that is between plane 32-32 and sidewall 26s3 of the first heat sink layer.

From a top-down view in FIG. 10c, a portion of hard mask layer 41 is shown at the bottom of opening 50 that has sidewalls 50s aligned perpendicular to plane 30-30, and a back side 42f that is parallel to plane 30-30. Edge 41c has two sections that are parallel to center plane 34-34 and formed a greater distance from the center plane than sides 35s, and has a third section parallel to plane 30-30 and formed between back side 42f and barrier side 35e.

Figure 11A:
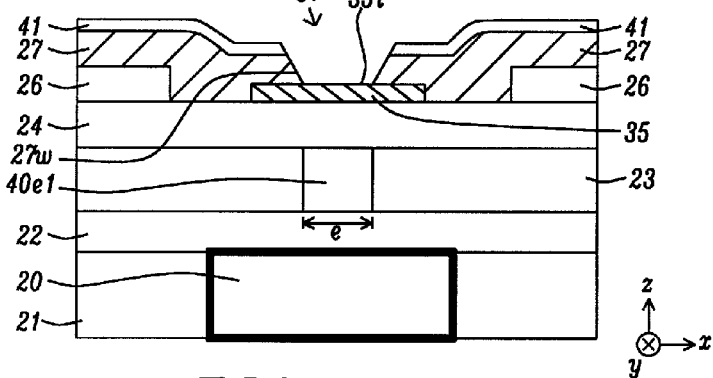
FIG. 11a, FIG. 11b, and FIG. 11c correspond to FIG. 10a, FIG. 10b, and FIG. 10c, respectively, after an opening is formed in the hard mask and second heat sink layer according to a process sequence of the present disclosure.
Figure 11B:
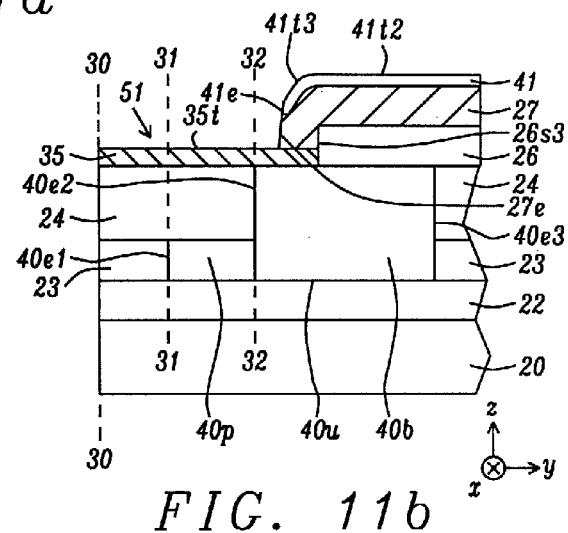
Figure 11C:
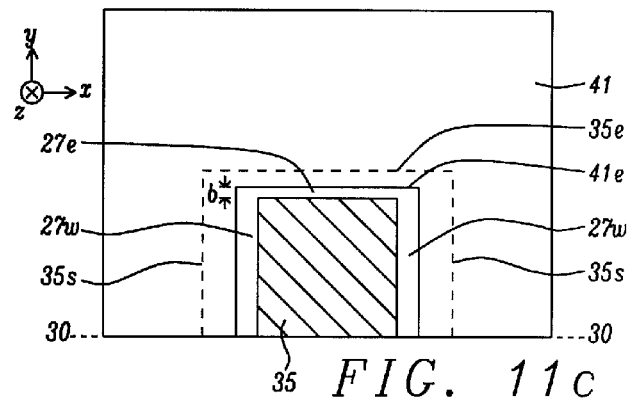

During the next sequence of steps represented by FIGS. 11a-11c, the opening in the photoresist layer is transferred through exposed portions of the hard mask layer 41 and second heat sink layer 27 by a reactive ion etch (RIE) process comprising $O_2$ and $Cl_2$ to generate opening 51. In addition, the photoresist layer is removed after the RIE process.

Referring to FIG. 11a that is a cross-sectional view along plane 31-31 in FIG. 11b, opening 51 has a cross-track width s1 that may be different from width s in FIG. 10a due to the nature of the etching process. Furthermore, the sides 27w may be sloped such that a bottom portion of the opening has a smaller cross-track width than the upper portion of the opening in hard mask layer 41. The opening exposes a portion of top surface 35t on barrier layer 35 that is aligned above peg end 40e1.

In FIG. 11b, a down-track cross-sectional view is depicted where opening 51 extends from plane 30-30 to a side 27e of the second heat sink layer that is aligned below a front facing edge 41e on curved hard mask portion 41t3. Side 27e is between plane 32-32 and sidewall 26s3 of the first heat sink layer.

In the top-down view in FIG. 11c, sloped sides 27w of the second heat sink layer are aligned perpendicular to plane 30-30 (and the eventual ABS) and are shown on either side of center plane 34-34 and between the exposed portion of barrier layer 35 and barrier layer sides 35s. In some embodiments, side 27e of the second heat sink layer is a distance b from 0 to 200 nm from the front facing edge 41e depending on the slope between edge 41e and top surface 35t in FIG. 11b, and represents a side of the opening that is formed parallel to plane 30-30.

Figure 12A:
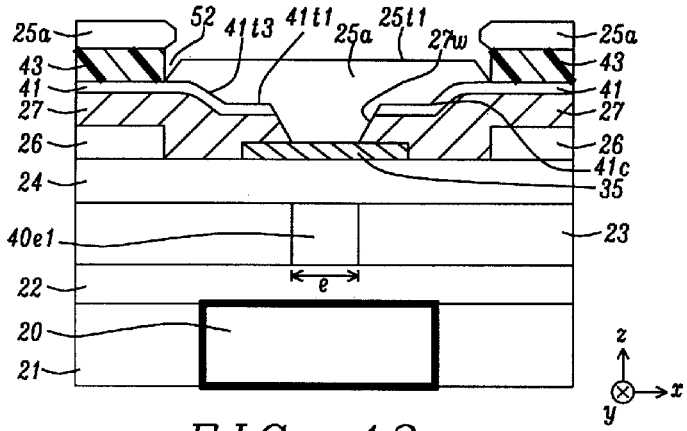
FIGS. 12a and 12b are cross-sectional views of the structure in FIG. 11a and FIG. 11b, respectively, after a main pole bottom portion is deposited in the opening according to a method of the present disclosure.
Figure 12B:
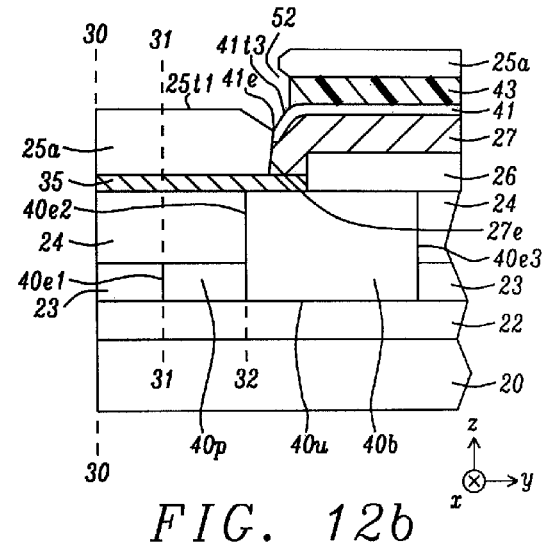

FIGS. 12a-12b illustrate the TAMR head structure following the next sequence in the fabrication process where a photoresist layer 43 is coated and patterned to form an opening 52 above opening 51. Opening 52 exposes a portion of the hard mask layer including curved section 41t3 and first planar section between edge 41c and second heat sink side 27w. Then, the main pole bottom portion 25a is deposited by electroplating, for example, in opening 52 thereby filling opening 51 and covering curved section 41t3 and first planar section 41t1 that were exposed by forming the opening 52.

Referring to FIG. 12a that is a cross-sectional view along plane 31-31 in FIG. 12b, main pole bottom portion 25a has a top surface 25t1 that is a greater distance from dielectric layer 24 than hard mask 41 and fills a substantial portion of opening 52. The magnetic layer that comprises main pole bottom portion 25a is also deposited on the photoresist layer 43 above first hard mask layer 26.

In the down-track cross-sectional view depicted in FIG. 12b, main pole bottom portion 25a preferably contacts the entire side 27e and a portion of curved hard mask section 41t3 below edge 41e.

Figure 13A:
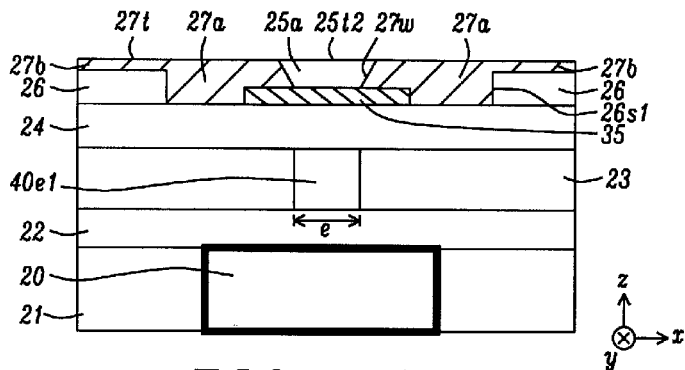
FIG. 13a and FIG. 13b correspond to the structures in FIG. 12a and FIG. 12b, respectively, after a chemical mechanical polish process is used to form a planar top surface on the main pole according to a process of the present disclosure.
Figure 13B:
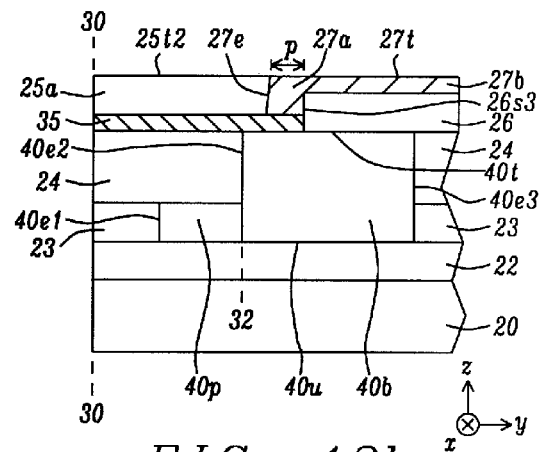

FIGS. 13a-13b depict the TAMR head structure after a CMP process is performed on the intermediate structure in FIGS. 12a-12b. FIG. 13a shows that photoresist layer 43, hard mask layer 41, and upper portions of the second heat sink layer 27 and main pole layer 25a are removed by a CMP process. A top surface 27t is formed on the second heat sink layer above first heat sink layer 26 and is coplanar with a top surface 25t2 of the main pole bottom portion. A key feature is that main pole bottom portion 25a remains only between sides 27w of a first section 27a of the second heat sink layer where the first section extends in a cross-track direction between bottom portion 25a and side 26s3 of the first heat sink layer. The first section 27a has a bottom surface that contacts barrier layer 35 that is not covered by the main pole and also contacts a top surface of dielectric layer 24 between the barrier layer and sidewall 26s1. There is also a second section 27b of the second heat sink layer which covers the top surface of the first heat sink layer.

According to the embodiment depicted in FIG. 13b, the first section 27a fills a gap with a height p along the y-axis direction between the main pole bottom portion 25a and side 26s3 of the first heat sink layer. Thus, a thermally stable Ru layer is advantageously formed as a barrier layer to prevent Au migration from the first heat sink layer 26 into the main pole. Furthermore, barrier layer 35 prevents Au that is proximate to plane 32-32 in the PPG back portion 40b from migrating in the z-axis direction into the main pole bottom portion 25a. However, there is still substantial contact between top surface 40t of the PPG back portion and the first heat sink layer to allow efficient dissipation of heat away from the PPG. In other words, first heat sink layer is relied upon to provide an excellent heat dissipation property while the second heat sink layer provides enhanced heat sink structural reliability, especially in a region proximate to front end 40e2 of the back PPG portion, and surrounding the main pole bottom portion.

Figure 14A:
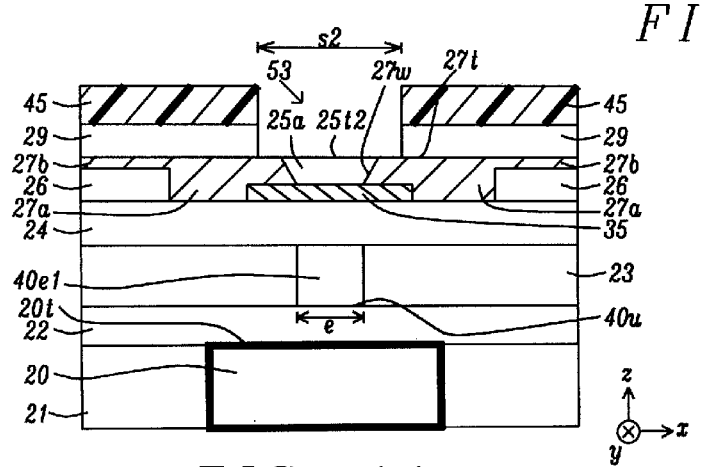
FIG. 14a and FIG. 14b show the structures in FIG. 13a and FIG. 13b, respectively, after an insulation layer is deposited on the planar top surface.
Figure 14B:
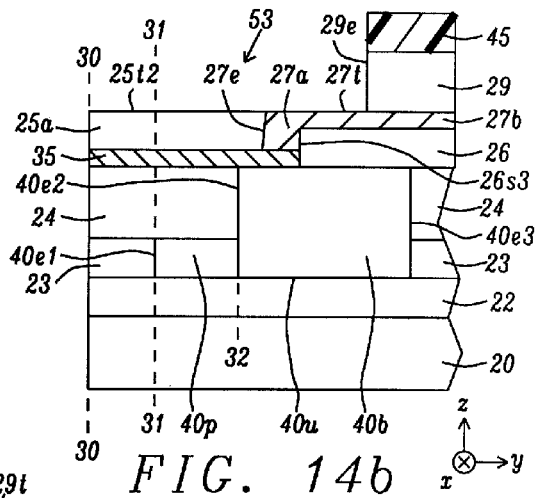

FIGS. 14a-14b show the TAMR head structure after the insulation layer 29 is formed on top surfaces 25t2 and 27t in FIG. 13a, and a photoresist layer 45 is coated and patternwise exposed to form an opening 53 that is aligned above the main pole bottom portion 25a. Insulation layer 29 is preferably made of $Al_2O_3$ or $SiO_2$. The opening is transferred through the aforementioned insulation layer with an etch process. FIG. 14a is a cross-sectional view along plane 31-31 in FIG. 14b and shows the opening exposes the entire top surface 25t2 of the bottom portion 25a and an adjacent section of top surface 27t above the first section 27a of the second heat sink layer. In the exemplary embodiment, the opening has a greater cross-track width s2 than that of the main pole bottom portion.

From a down-track cross-sectional view in FIG. 14b, the opening 53 uncovers a substantial section of top surface 27t proximate to back side 27e including a portion above second section 27b such that insulation layer side 29e facing the plane 30-30 is a greater distance from plane 31-31 than first heat sink side 26s3. First section 27a has a greater thickness in a down-track direction than thickness t of the first heat sink layer.

FIGS. 15a-15b depict the TAMR head structure after the main pole upper portion 25b is deposited by electroplating, for example, to fill opening 53 and a CMP process is then performed to remove photoresist layer 45 thereby forming a planar top surface 25t on the main pole upper portion that is coplanar with a top surface 29t of the insulation layer.

In an enlarged cross-sectional view of the composite heat sink that is depicted in FIG. 15a, the sides of a main pole lower portion 25a adjoin a first section 27a of the second heat sink layer and do not contact the less thermally stable heat sink layer 26. Meanwhile, in FIG. 15b, a second section 27b of the second heat sink layer separates a top surface of the first heat sink layer from a back end of a main pole upper portion 25b. Note that barrier layer 35 also serves to prevent diffusion of a metal such as Au from the PPG back portion 40b through a bottom surface of the main pole. Main pole upper portion 25b and bottom portion 25a both have a front side at plane 30-30. Furthermore, the second section 27b of second heat sink layer 27 preferably has a thickness of at least 20 to 30 nm above the first heat sink layer 26 in order to provide a barrier to Au migration from the first heat sink layer into main pole upper portion 25b.

Thereafter, a conventional sequence of steps may be followed to form the remaining layers in the TAMR head including an uppermost protective layer 39. Finally, a lapping process is performed to form ABS 60-60 along a plane that is parallel to, and between planes 31-31 and 32-32 in FIG. 15b. As a result, the height of peg 40p will be shortened in the y-axis direction to a distance between 0 and about 150 nm between the ABS and front side 40e2. FIG. 16 represents an enlarged view of the TAMR head 90 (FIG. 1) above waveguide 20 and proximate to the ABS 60-60 after the fabrication process according to the present disclosure is completed. Main pole bottom portion has a front side 25f1 at the ABS while main pole upper portion has a front side 25f2 at the ABS.

Figure 17:
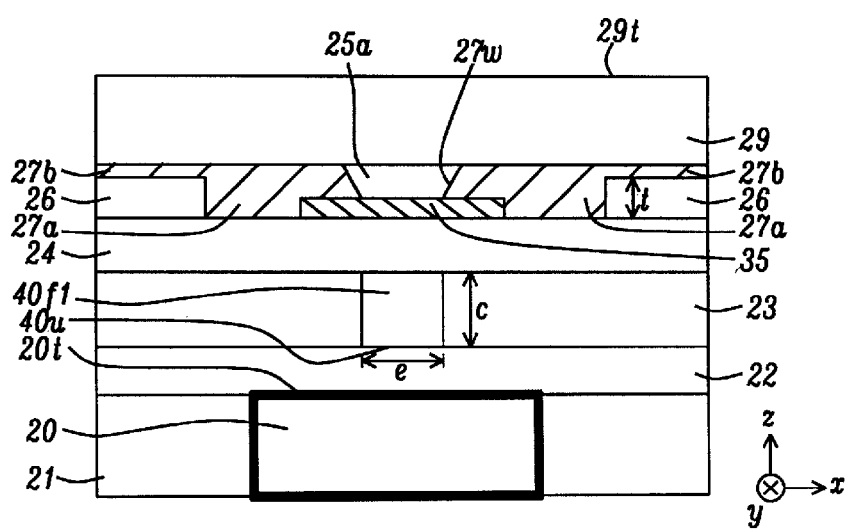
FIG. 17 is an ABS view of an alternative embodiment of the present disclosure wherein the main pole upper portion is recessed from the ABS.
Figure 18:
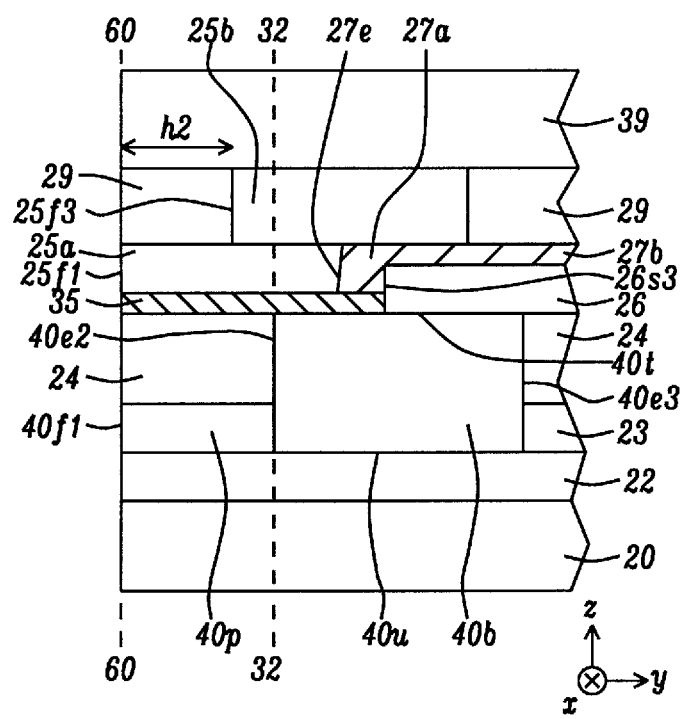
FIG. 18 is a down-track cross-sectional view of the alternative embodiment in FIG. 17.

Although a two piece main pole comprising layers 25a, 25b at the ABS is shown in the preferred embodiment, the present disclosure anticipates that in a more general embodiment, any main pole having a front side at the ABS and comprising a leading edge, trailing edge, and at least two sides is suitable in a TAMR head with waveguide 20, PPG 40, and composite heat sink 28 described herein. For example, in an alternative embodiment shown in FIG. 17, upper portion 25b may be recessed a certain distance from the ABS such that insulation layer 29 covers top surface 25t2 of the main pole bottom portion and top surface 27t of the second heat sink layer at the ABS. FIG. 18 shows a down-track cross-sectional view of the TAMR structure in FIG. 17 where a front side 25f3 of the main pole upper portion is facing the ABS 60-60 and is recessed a distance h2 therefrom. In some embodiments, the front face may be a greater distance from the ABS than plane 32-32. Otherwise, all other features are retained from the TAMR structure 90 in FIG. 1. However, those skilled in the art will appreciate that other main pole configurations may be employed while still retaining the benefits provided by the composite heat sink of the present disclosure.

The present disclosure provides a TAMR head structure with substantial benefits over the prior art in that improved reliability is achieved by separating a less thermally stable Au heat sink layer from the sides and bottom surface, of the main pole, and from a peg portion of the PPG such that there is no Au migration into the main pole and no thermal break down of the Au heat sink component due to heat generated by a front end of the PPG. A thermally stable heat sink layer such as Ru is relied on to serve as a barrier between the main pole and first heat sink layer. In addition, a barrier layer is used to separate a PPG top surface from a bottom surface of the main pole to also avoid Au migration from the PPG into the main pole. The method of fabricating the TAMR head allows for flexibility in designing the composite heat sink by adjusting the cross-track, down-track, and height perpendicular to the ABS for each heat sink layer thereby independently optimizing the barrier property of the top heat sink layer and the heat dissipation capacity of the lower heat sink layer. The composite heat sink is compatible with a variety of PPG designs.

While this disclosure has been particularly shown and described with reference to, the preferred embodiment thereof, it will be understood by those skilled in the art that various changes in form and details may be made without departing from the spirit and scope of this disclosure.

We claim:
1. A thermally assisted magnetic recording (TAMR) head comprising:
 (a) a main pole that produces a magnetic field on a magnetic medium during a write process, the main pole has a front side at an air bearing surface (ABS) and includes a bottom portion with two sloped sides aligned perpendicular to the ABS and terminating at a back side and with a bottom surface contacting a top surface of a barrier layer, and an upper portion with two sides that are perpendicular to the ABS and terminating at a back end that is a greater distance from the ABS than the bottom portion back side;

(b) a waveguide that captures light energy from a light source and propagates the light energy toward the ABS, the waveguide has a top surface that faces the bottom surface of the main pole and is separated from a planar bottom surface of a planar plasmon generator (PPG) by a first gap distance;

(c) the PPG that couples light energy from the waveguide to a surface plasmon (SP) mode along the planar PPG bottom surface, the SP mode is propagated to the ABS and projected onto a localized region of the magnetic medium to facilitate the write process, the PPG comprises:

(1) a peg with a front side at the ABS and a back side that adjoins a front side of a larger PPG back portion, the peg is formed between the waveguide and the barrier layer and has a top surface that is a second gap distance from the barrier layer, and has a first thickness less than a second thickness of the PPG back portion; and (2) the PPG back portion having a top surface with a front section that contacts a bottom surface of the barrier layer, and a back section which contacts a bottom surface of a first heat sink layer, and a back side formed a first distance from the ABS; and (d) a composite heat sink that comprises:

(1) the first heat sink layer made of a noble metal with substantial heat dissipation capacity that is formed on a dielectric layer and on the PPG back portion, and with sides surrounding the main pole bottom portion, and a front end at the ABS at a first cross-track distance from an adjacent side of the barrier layer, and with a back side that is separated from the back side of the main pole bottom portion by a first section of a second heat sink layer, and a top surface that is separated from a bottom surface of the main pole upper portion by a second section of the second heat sink layer; and (2) the second heat sink layer comprising a second metal having thermal stability to at least 450° C., and with a front side at the ABS, the first section of the second heat sink layer has a first side adjoining each of the two sloped sides of the main pole bottom portion, a bottom surface contacting a portion of barrier layer top surface and the dielectric layer, a second side opposite the first side and adjoining the sides of the first heat sink layer along a direction perpendicular to the ABS, and a third side that adjoins a back side of the first heat sink layer, the second heat sink layer second section completely covers a top surface of the first heat sink layer.

2. The TAMR head of claim 1 wherein the peg extends a distance between 0 and about 150 nm from the ABS to the front side of the PPG back portion.

3. The TAMR head of claim 1 wherein the first heat sink layer is made of Au or Ag and has a thickness of about 30 to 80 nm in a down-track direction.

4. The TAMR head of claim 1 wherein the second heat sink layer is one of Ru, Zr, Pd, Cu, Ni, Fe, Co, or Ta, and the first section thereof has a thickness greater than a thickness of the first heat sink layer.

5. The TAMR head of claim 1 wherein the main pole bottom portion is aligned above the peg in a down-track direction and has a cross-track width that is greater than a cross-track width of the peg.

6. The TAMR head of claim 1 wherein the barrier layer is comprised of Zr, Pd, Cu, Ni, Fe, Co, Ta, TaOx, $SiO_2$, $Al_2O_3$, TaOx, or SiON.

7. The TAMR head of claim 1 wherein the first section of the second heat sink layer fills a gap with a distance of about 20 to 30 nm between the back side of the main pole bottom portion and the back side of the first heat sink layer.

8. The TAMR head of claim 1 wherein the barrier layer extends a distance of about 300 to 5000 nm from the front side of the PPG back portion toward a back end of the TAMR head.

9. The TAMR head of claim 1 wherein the first cross-track distance between the front end of the first heat sink layer and the adjacent side of the barrier layer at the ABS is between 0 and about 300 nm.

10. The TAMR head of claim 1 wherein the barrier layer has a cross-track width greater than a cross-track width of the main pole bottom portion.

11. A thermally assisted magnetic recording (TAMR) head comprising:

(a) a main pole that produces a magnetic field on a magnetic medium during a write process, the main pole has a front side at an air bearing surface (ABS), two sloped sides aligned perpendicular to the ABS and terminating at a back side, and a bottom surface contacting a top surface of a barrier layer;

(b) a waveguide that captures light energy from a light source and propagates the light energy toward the ABS, the waveguide has a top surface that faces the bottom surface of the main pole and is separated from a planar bottom surface of a planar plasmon generator (PPG) by a first gap distance;

(c) the PPG that couples light energy from the waveguide to a surface plasmon (SP) mode along the planar PPG bottom surface, the SP mode is propagated to the ABS and projected onto a localized region of the magnetic medium to facilitate the write process, the PPG comprises:

(1) a peg with a front side at the ABS and a back side that adjoins a front side of a larger PPG back portion, the peg is formed between the waveguide and the barrier layer and has a top surface that is a second gap distance from the barrier layer, and has a first thickness less than a second thickness of the PPG back portion; and (2) the PPG back portion having a top surface with a front section that contacts a bottom surface of the barrier layer, and a back section which contacts a bottom surface of a first heat sink layer, and a back side formed a first distance from the ABS; and (d) a composite heat sink that comprises:

(1) the first heat sink layer made of a noble metal with substantial heat dissipation capacity that is formed on a dielectric layer and on the PPG back portion, and with sides surrounding the main pole, and a front end at the ABS at a first cross-track distance from an adjacent side of the barrier layer, and with a back side that is separated from the back side of the main pole by a first section of a second heat sink layer; and (2) the second heat sink layer comprising a second metal having thermal stability to at least 450° C., and with a front side at the ABS, the first section of the second heat sink layer has a first side adjoining each of the two sloped sides, a bottom surface contacting a portion of barrier layer top surface and the dielectric layer, a second side adjoining the sides of the first heat sink layer along a direction perpendicular to the ABS, and a third side that adjoins the back side of the first heat sink layer, a section of the second heat sink layer completely covers a top surface of the first heat sink layer and has a top surface that is coplanar with a top surface of the first section.

12. The TAMR head of claim 11 wherein the peg extends a distance between 0 and about 150 nm from the ABS to the front side of the PPG back portion.

13. The TAMR head of claim 11 wherein the first heat sink layer is made of Au or Ag and has a thickness of about 30 to 80 nm in a down-track direction.

14. The TAMR head of claim 11 wherein the second heat sink layer is one of Ru, Zr, Pd, Cu, Ni, Fe, Co, or Ta, and the first section thereof has a thickness greater than a thickness of the first heat sink layer.

15. The TAMR head of claim 11 wherein the main pole is aligned in a down-track direction above the peg and has a cross-track width that is greater than a cross-track width of the peg.

16. The TAMR head of claim 11 wherein the barrier layer is comprised of Zr, Pd, Cu, Ni, Fe, Co, Ta, TaOx, $SiO_2$, $Al_2O_3$, TaOx, or SiON.

17. The TAMR head of claim 11 wherein the first section of the second heat sink layer fills a gap with a distance of about 20 to 30 nm between the back side of the main pole and the back side of the first heat sink layer.

18. The TAMR head of claim 11 wherein the barrier layer extends a distance of about 300 to 5000 nm from the front side of the PPG back portion toward a back end of the TAMR head.

19. The TAMR head of claim 11 wherein the first cross-track distance between the front end of the first heat sink layer and the adjacent side of the barrier layer at the ABS is between 0 and about 300 nm.

20. The TAMR head of claim 11 wherein the barrier layer has a cross-track width greater than a cross-track width of the main pole.

21. A method of fabricating a TAMR head, comprising:
   (a) providing a dielectric layer on a substrate wherein a planar plasmon generator (PPG) has a peg portion with a front end at a first plane, and a larger back portion with a front side adjoining a peg back end and having a top surface that is perpendicular to the first plane and parallel to a waveguide that is separated from a PPG bottom surface by a cladding layer;
   (b) forming a barrier layer on the dielectric layer, the barrier layer has a front side at the first plane, two sides that form a cross-track width greater than a cross-track width of the peg front end, and a back side that is a greater distance from the first plane than a back side of the PPG back portion;
   (c) forming a first heat sink layer made of a noble metal that surrounds the barrier layer, the first heat sink layer has two side sections with an end at the first plane and each side section separated from a barrier layer side by a first distance, and a back section with a front side that adjoins the barrier layer back side;
   (d) depositing a stack with a lower second heat sink layer with thermal stability to at least 450° C. and an upper hard mask layer, the stack covers the first heat sink layer, the barrier layer, and exposed portions of the dielectric layer;
   (e) forming a first opening in the stack that exposes a portion of the barrier layer that is aligned above the peg portion;
   (f) coating a photoresist layer and forming a second opening therein that exposes the first opening and a portion of the hard mask layer adjacent to the first opening;
   (g) depositing a magnetic layer that fills the first opening and substantially fills the second opening;
   (h) performing a chemical mechanical polish (CMP) process to remove the photoresist layer and hard mask layer, and form a top surface on the second heat sink layer that is coplanar with a top surface of the magnetic layer which serves as a main pole; and
   (i) forming an air bearing surface (ABS) along a second plane that is between the first plane and the peg back end, each of the waveguide, PPG, barrier layer, first and second heat sink layers, and main pole has a side at the ABS.

22. The method of claim 21 further comprised of forming a second magnetic layer on the main pole, and a yoke that contacts a top surface of the second magnetic layer, the yoke forms a magnetic connection to a magnetic coupling layer proximate to a back end of the TAMR head.

23. The method of claim 21 wherein the first heat sink layer is made of Au or Ag and has a thickness of about 30 to 80 nm in a down-track direction.

24. The method of claim 21 wherein the second heat sink layer is one of Ru, Zr, Pd, Cu, Ni, Fe, Co, or Ta, and has a first section between the main pole and the first heat sink layer, the first section has a thickness greater than a thickness of the first heat sink layer.

25. The method of claim 22 wherein second heat sink layer has a second section between a top surface of the first heat sink layer and a bottom surface of the second magnetic layer.

26. The method of claim 21 wherein the first distance between 0 to about 300 nm.

27. The method of claim 21 wherein the barrier layer is comprised of Zr, Pd, Cu, Ni, Fe, Co, Ta, TaOx, $SiO_2$, $Al_2O_3$, TaOx, or SiON.

28. The method of claim 21 wherein the hard mask is one of Ta and $Al_2O_3$, and the first opening is formed by an etch process comprising $Cl_2$ and $O_2$.

29. The method of claim 21 wherein the first section of the second heat sink layer fills a gap with a distance of about 20 to 30 nm between a back side of the main pole and the front side of the first heat sink layer back section.

30. The method of claim 21 wherein the barrier layer extends a distance of about 300 to 5000 nm from the front side of the PPG back portion toward a back end of the TAMR head.

* * * * *